(12) United States Patent
Cui et al.

(10) Patent No.: US 9,407,519 B2
(45) Date of Patent: Aug. 2, 2016

(54) VIRTUAL NETWORK FLOW MONITORING

(71) Applicant: VMware, Inc., Palo Alto, CA (US)

(72) Inventors: Liang Cui, Beijing (CN); Wei Zhang, Beijing (CN); Jingchun Jason Jiang, Beijing (CN); Caixia Jiang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 434 days.

(21) Appl. No.: 13/831,685

(22) Filed: Mar. 15, 2013

(65) Prior Publication Data

US 2014/0281030 A1    Sep. 18, 2014

(51) Int. Cl.
*H04L 12/717* (2013.01)
*H04L 12/26* (2006.01)

(52) U.S. Cl.
CPC ............ *H04L 43/028* (2013.01); *H04L 43/026* (2013.01); *Y02B 60/33* (2013.01)

(58) Field of Classification Search
CPC .............. H04L 29/06; H04L 29/08549; H04L 29/08072
USPC .......................................................... 709/244
See application file for complete search history.

(56) References Cited

U.S. PATENT DOCUMENTS

| | | | | |
|---|---|---|---|---|
| 2012/0304175 | A1* | 11/2012 | Damola et al. | 718/1 |
| 2012/0311475 | A1* | 12/2012 | Wong | 715/772 |
| 2013/0114612 | A1* | 5/2013 | Singh et al. | 370/401 |
| 2013/0297768 | A1* | 11/2013 | Singh | 709/224 |
| 2013/0318238 | A1* | 11/2013 | Hall et al. | 709/224 |
| 2014/0219086 | A1* | 8/2014 | Cantu' et al. | 370/231 |

OTHER PUBLICATIONS

Weinboldt, Brad, "Virtualization and the Cloud: The Trouble is Troubleshooting", accessed at <<http://www.forbes.com/sites/ciocentral/2011/02/28/virtualization-and-the-cloud-the-trouble-is-troubleshooting/, Forbes, Feb. 28, 2011, 3 pages.
Unknown, "Appendix A: Troubleshooting and Best Practices", Cisco Prime Network Control System Configuration Guide, Jul. 2011, 10 pages.
Unknown, "Netflow", accessed at <<http://www.wikipedia.org/wiki/netflow>>, accessed on Jan. 21, 2013, 9 pages.
Zhou et al., "Virtual Network Tracing", RADIO, 2011, 1 page.

* cited by examiner

*Primary Examiner* — Nicholas Taylor
*Assistant Examiner* — Chong G Kim

(57) ABSTRACT

Embodiments perform end-to-end virtual network flow monitoring in a virtual datacenter and provide differentiated views to users based on user role. A target flow pattern describing data packets of interest is distributed to a plurality of applications managing VMs in the virtual datacenter, such as hosts, virtual gateways, and other virtual network applications. Each of the applications monitors data packets routed by the application by comparing the data packets to the flow pattern and selectively collecting context data describing the data packets. The context data collected by the applications is aggregated at a remote server for analysis and reporting.

20 Claims, 12 Drawing Sheets

VIRTUAL NETWORK FLOW MONITORING

BACKGROUND

With the increased use of cloud computing and virtualization technologies, virtual datacenter architectures have grown in scale and complexity. In some instances, thousands of virtual machines (VMs) act as hosts, virtual gateways, and other network appliances to implement complex virtual networks. Troubleshooting network problems in such virtualized environments is difficult with existing monitoring systems that are not adapted to operate in cloud computing environments. Further, some virtual datacenters have multiple management and data path layers on top of the physical network infrastructure. For example, a data path may have a network interface card layer, a local area network encapsulation layer, a virtual network appliance layer, an input/output layer, and so on. Further, there may be logical network concepts such as a virtual network, an organization network, zone, endpoint, and so on. Because some of these layers and logical network concepts do not correspond to traditional physical infrastructure, some of the existing monitoring systems are in capable of identifying the source of network problems in virtualized environments.

Some existing monitoring systems provide packet-based probing by sending probe packets along the data path to identify physical network connectivity issues. Such systems, however, fail to present a high-level logical view to users, fail to provide network flow-based monitoring, and fail to provide detailed flow information within hosts. Further, the probe packets typically terminate at virtual gateways within the virtual datacenter due to security policies. In addition, such systems have a high resource cost (e.g., processing, memory, latency, etc.) by collecting all network traffic going through routers and switches.

Other existing systems focus on recording packet information within a single host, but these systems fail to provide end-to-end network flow monitoring along the entire network data path.

SUMMARY

One or more embodiments described herein provide end-to-end virtual network flow monitoring in a virtual datacenter having a plurality of virtual machines (VMs). In some embodiments, the virtual datacenter distributes a flow pattern to a plurality of applications managing the VMs. For example, the applications are associated with host computing devices, virtual gateways, and other network applications. The flow pattern describes data packets of interest to a user. Each of the applications monitors data packets routed by the application by, for example, comparing the data packets to the flow pattern. For each of the routed data packets that match the flow pattern, applications collect context data describing the data packet and transmit the collected context data to a remote server. In this manner, the virtual datacenter aggregates, from the plurality of applications routing data packets, context data for the data packets that match the flow pattern. The virtual datacenter filters the aggregated context data based on a role associated with the user. The filtered context data is presented to the user.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments described herein provide a virtual network tracing and monitoring system that identifies and selectively monitors network flows, based on a target flow pattern 130, end-to-end across a virtual network path in a virtual datacenter 302. In addition to tracing the network flow within hosts, aspects of the disclosure leverage knowledge of virtual datacenter 302 infrastructure to identify, and enable tracing across, logical network edges or other boundaries (e.g., virtual network edges, organization network edges, zones, etc.) along the virtual network path. In some embodiments, virtual network appliances selectively produce a "footprint" of context data for data packets matching flow pattern 130 (e.g., provided by a user 108). The context data is aggregated at a remote server for analysis and reporting.

Aspects of the disclosure further enable different users 108 to troubleshoot and identify the source of network issues in different levels within virtual datacenter 302. In particular, the aggregated context data is filtered or otherwise mined based on different user roles to generate different virtual network monitoring views for presentation to the users 108. This enables the different users 108 to identify the source of network issues within virtual datacenter 302 according their goals and knowledge levels.

Accordingly, aspects of the disclosure trace and selectively collect context data for data packets along the entire virtual network data path, including across multiple processing layers. Further, the tracing may occur periodically, intermittently, and/or on-demand, with a reduced negative impact on performance and traffic flooding relative to existing systems due at least to the selectively monitoring. For example, the network traffic is monitored without generating ping messages. As such, aspects of the disclosure provide a consistent, user-differentiated, one-stop troubleshooting and reporting experience to users 108. For example, different users 108 can troubleshoot network issues by operating on the same management workflow and user interface, without accessing lower level infrastructure information.

An example of a virtualized environment is next described.

Figure 1:
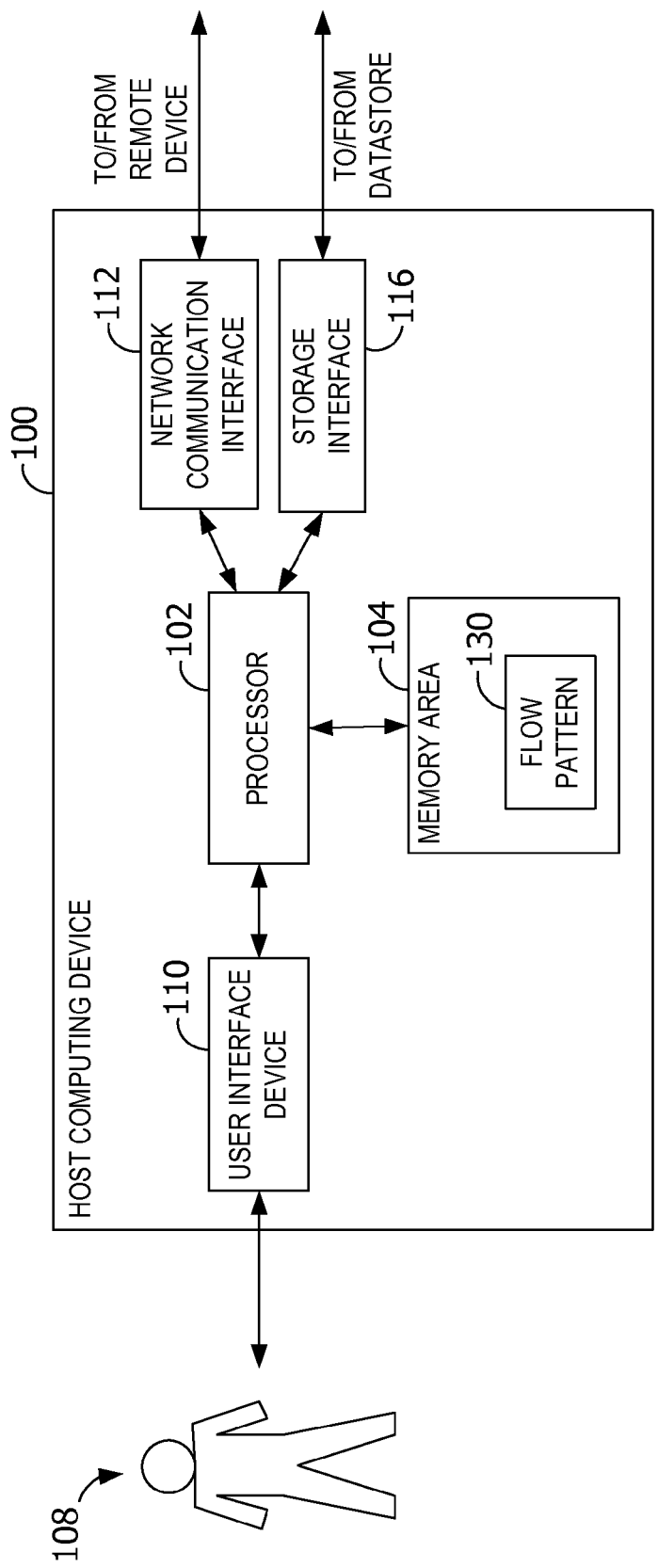
FIG. 1 is a block diagram of an exemplary host computing device.

FIG. 1 is a block diagram of an exemplary host computing device 100. Host computing device 100 includes a processor 102 for executing instructions. In some embodiments, executable instructions are stored in a memory area 104. Memory area 104 is any device allowing information, such as executable instructions and/or other data, to be stored and retrieved. For example, memory area 104 may include one or more random access memory (RAM) modules, flash memory modules, hard disks, solid state disks, and/or optical disks.

As described further herein, memory 104 stores at least one of flow pattern 130 for use in monitoring data packets.

Host computing device 100 may include a user interface device 110 for receiving data from user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
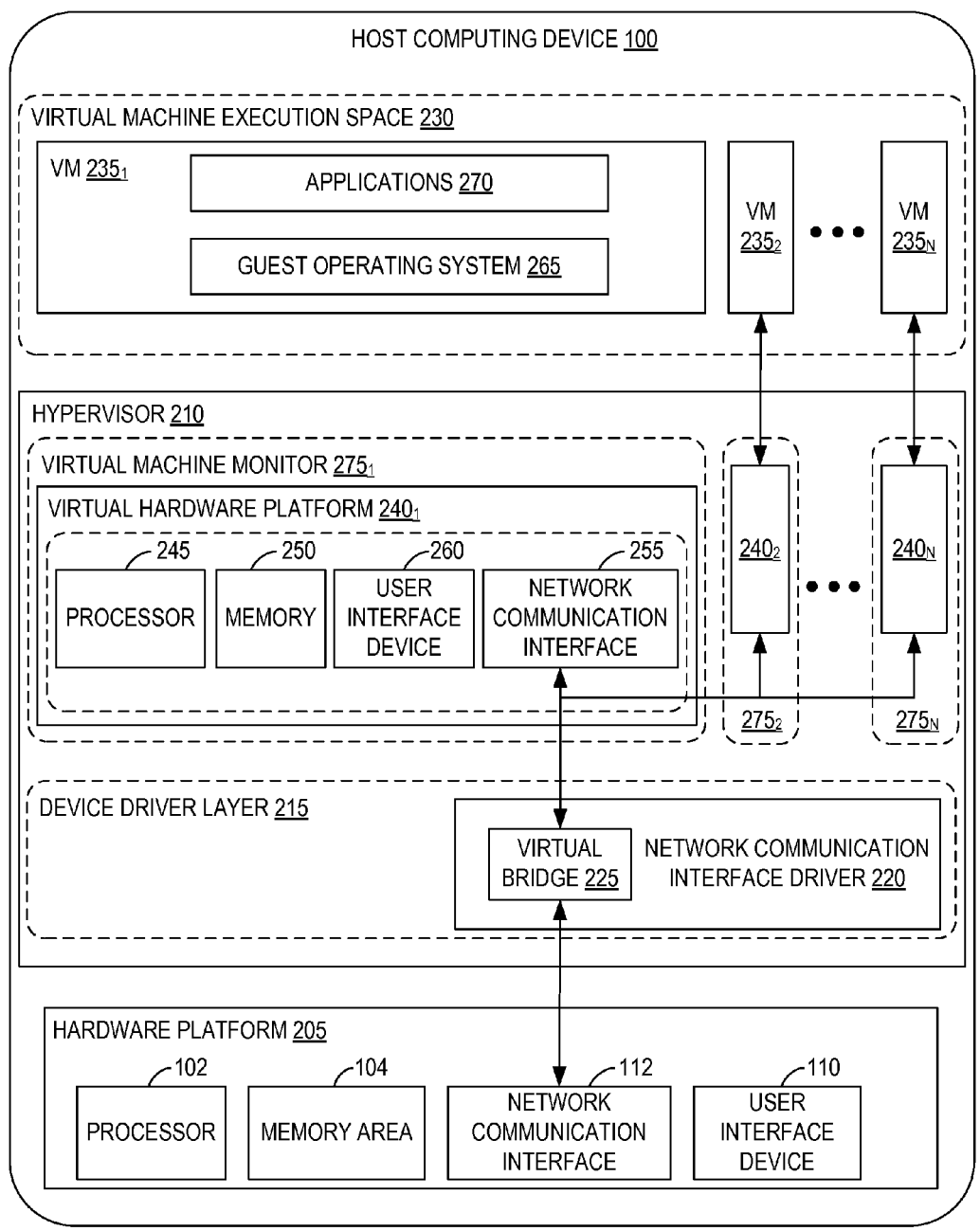
FIG. 2 is a block diagram of virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory area 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory area 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

In some embodiments, host computing device 100 represents any device executing instructions (e.g., as application programs, operating system functionality, or both) to implement the operations and functionality described herein. For example, one or more of host computing devices 100 execute instructions to implement the operations illustrated in FIG. 4 and/or FIG. 5. Host computing device 100 may include any computing device or processing unit. For example, host computing device 100 may represent a group of processing units or other computing devices, such as in a cloud computing configuration.

Processor 102 includes any quantity of processing units, and is programmed to execute computer-executable instructions for implementing aspects of the disclosure. The instructions may be performed by processor 102 or by multiple processors executing within host computing device 100, or performed by a processor external to host computing device 100 (e.g., another processor available within virtual datacenter 302). In some embodiments, processor 102 is programmed to execute instructions such as those illustrated in the figures.

Memory area 104 includes any quantity of computer-readable media associated with or accessible by host computing device 100 or other entity within virtual datacenter 302. Memory area 104, or portions thereof, may be internal to host computing device 100, external to host computing device 100, or both.

Figure 3:
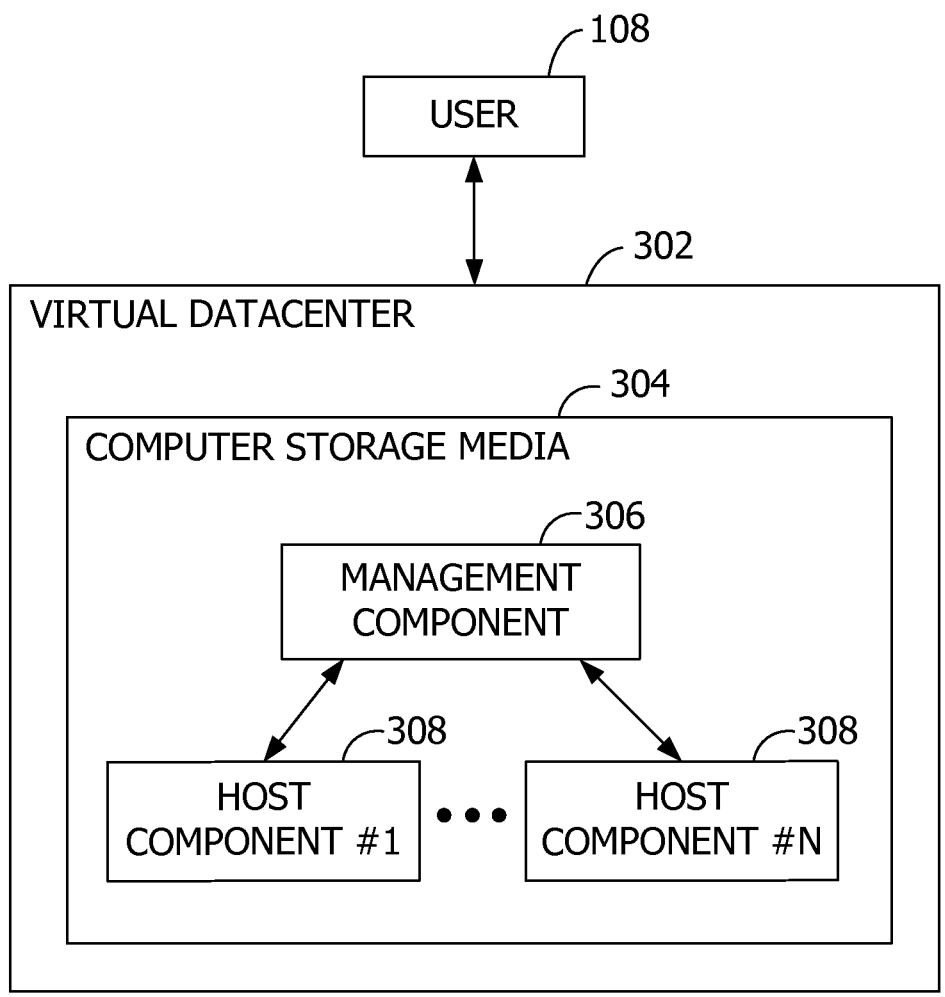
FIG. 3 is a block diagram of components associated with a virtual datacenter.

FIG. 3 is a block diagram of components associated with virtual datacenter 302. In the example of FIG. 3, user 108 interacts with virtual datacenter 302. User 108 may be classified, categorized, or typed based on a role, employment title, and/or interests of user 108. For example, user 108 includes, but is not limited to, an administrator of virtual datacenter 302, an owner of a virtual application, a developer, and/or other user involved with virtual datacenter 302. In some embodiments, the amount and content of flow monitoring and/or tracing data (e.g., collected context data describing data packets) is dependent on the type, category, role, or classification of user 108.

As shown in FIG. 3, virtual datacenter 302 includes one or more computer storage media 304, such as memory area 104 in some embodiments. Computer storage media 304 store components that, when executed by a processor such as processor 102, perform various operations. The components illustrated in FIG. 3 include a management component 306 communicating with each of a plurality of host components 308, such as host component #1 through host component #N.

The functionality associated with management component 306 is described below with reference to FIG. 4. In some embodiments, this functionality is implemented by a cloud operating system, a cloud application, a virtual datacenter operating system, a virtual datacenter application, and/or other logic or code supporting an environment having a plurality of VMs executing therein. An example of a cloud operating system includes VMware's vSphere brand software, while an example of a virtual datacenter operation system and/or application includes VMware's vCloud Director software.

Further, the functionality associated with host components 308 is described below with reference to FIG. 5. In some embodiments, this functionality is implemented by a virtualization layer such as hypervisor 210. For example, each of host components 308 manages a plurality of VMs.

Figure 4:
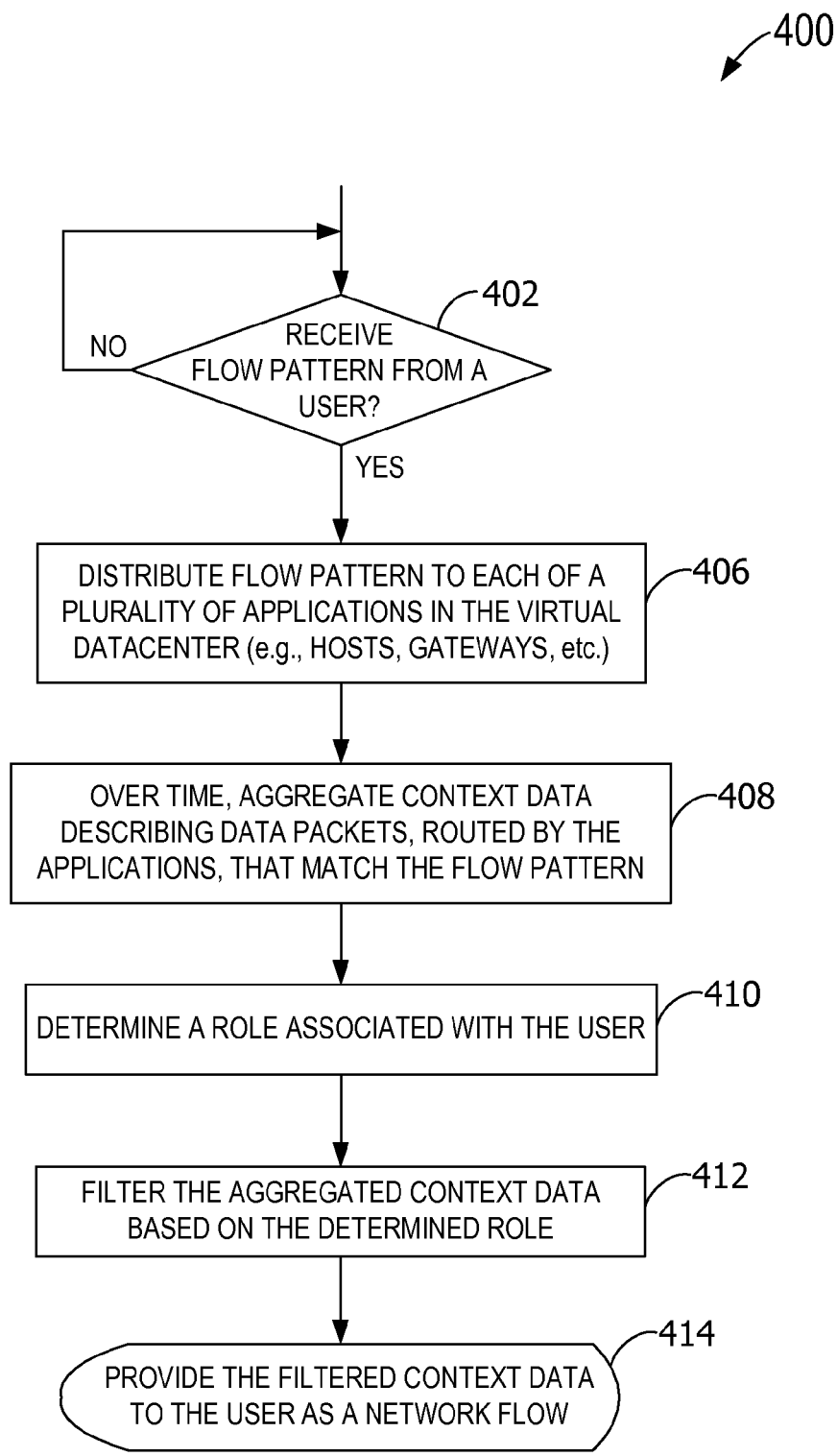
FIG. 4 is a flowchart of an exemplary method performed by the virtual datacenter to initiate flow monitoring in virtual networks in the virtual datacenter.

FIG. 4 is a flowchart of an exemplary method 400 performed by virtual datacenter 302 to initiate flow monitoring in virtual networks in virtual datacenter 302. For example, one or more of the operations illustrated in FIG. 4 may be performed by management component 306 illustrated in FIG. 3. However, while method 400 is described with reference to execution by virtual datacenter 302 (shown in FIG. 3), it is contemplated that method 400 may be performed by any computing device, application, and/or other entity. For example, method 400 may be performed by host computing device 100.

At 402, virtual datacenter 302 checks whether flow pattern 130 has been received from user 108. For example, flow pattern 130 may be received or identified as part of a request from user 108 to initiate virtual network flow monitoring. Flow pattern 130 describes characteristics of data packets of interest to user 108. The characteristics relate to the content and/or structure of the data packets. In some embodiments, an exemplary flow pattern 130 includes a source address and a destination address. Flow pattern 130 may include other data such as user-defined keys, a protocol type, and/or other data. Exemplary protocol types include, but are not limited to, a transmission control protocol (TCP) and/or a user datagram protocol (UDP). In some embodiments, flow pattern 130 identifies a source Internet Protocol (IP) address, a destination IP address, a source port for TCP/UDP, a destination port for TCP/UDP, and an IP protocol. While flow pattern 130 may be represented by any data structure, an example of a data structure includes the following 5-tuple: <sourceip_address, destination_ip_address, source port, destination port, protocol_type>.

Flow pattern 130 may also include rules or other operations or tests to be performed on the data packets when evaluating whether the data packets match flow pattern 130. For example, as an alternative or addition to analyzing the source address and destination address of each of the data packets, a hash of each data packet may be calculated and compared to a hash included in flow pattern 130. In this manner, particular data packets may be selected, as further described below.

Upon receipt of flow pattern 130, virtual datacenter 302 stores flow pattern 130 in a memory area associated with virtual datacenter 302. At 406, virtual datacenter 302 distributes flow pattern 130 to one or more devices, applications, and/or other entities within virtual datacenter 302 that handle (e.g., route) data packets. In some embodiments, one or more of these entities manage a plurality of VMs as part of at least one virtual network. For example, virtual datacenter 302 may distribute flow pattern 130 to one or more of host components 308 illustrated in FIG. 3.

In some embodiments, virtual datacenter 302 transmits flow pattern 130 to each of host computing devices 100 and virtual gateways within virtual datacenter 302. In another example, only particular entities within virtual datacenter 302 are selectively targeted (e.g., a subset of the available host computing devices 100, applications, and/or virtual gateways). In some embodiments, a plurality of applications operates as, or otherwise implements some functions of, host computing device 100 and/or a virtual gateway.

At 408, over time, virtual datacenter 302 aggregates context data describing data packets that match the distributed flow pattern 130 from entities (e.g., host components 308) within virtual datacenter 302. For example, the context data is received from the entities in virtual datacenter 302 that handle the data packets, have received flow pattern 130, and have found data packets that match flow pattern 130. The context data may be aggregated across virtual networks within virtual datacenter 302 and/or across virtual datacenters 302. For example, the context data may be aggregated across one or more logical network boundaries. The context data relating to a single packet may be referred to as a footprint record.

At 410, virtual datacenter 302 determines a role of user 108. The role may be specified in, for example, the request received from user 108. The role may also be derived from past requests from user 108, feedback from user 108 resulting from past requests, default values, and/or other factors.

At 412, virtual datacenter 302 filters the aggregated context data based on the role of user 108. For example, the context data may be reduced to a level of detail associated with the determined role of user 108. At 414, virtual datacenter 302 provides the filtered context data to user 108. In some embodiments, virtual datacenter 302 displays the filtered context data to user 108.

Figure 5:
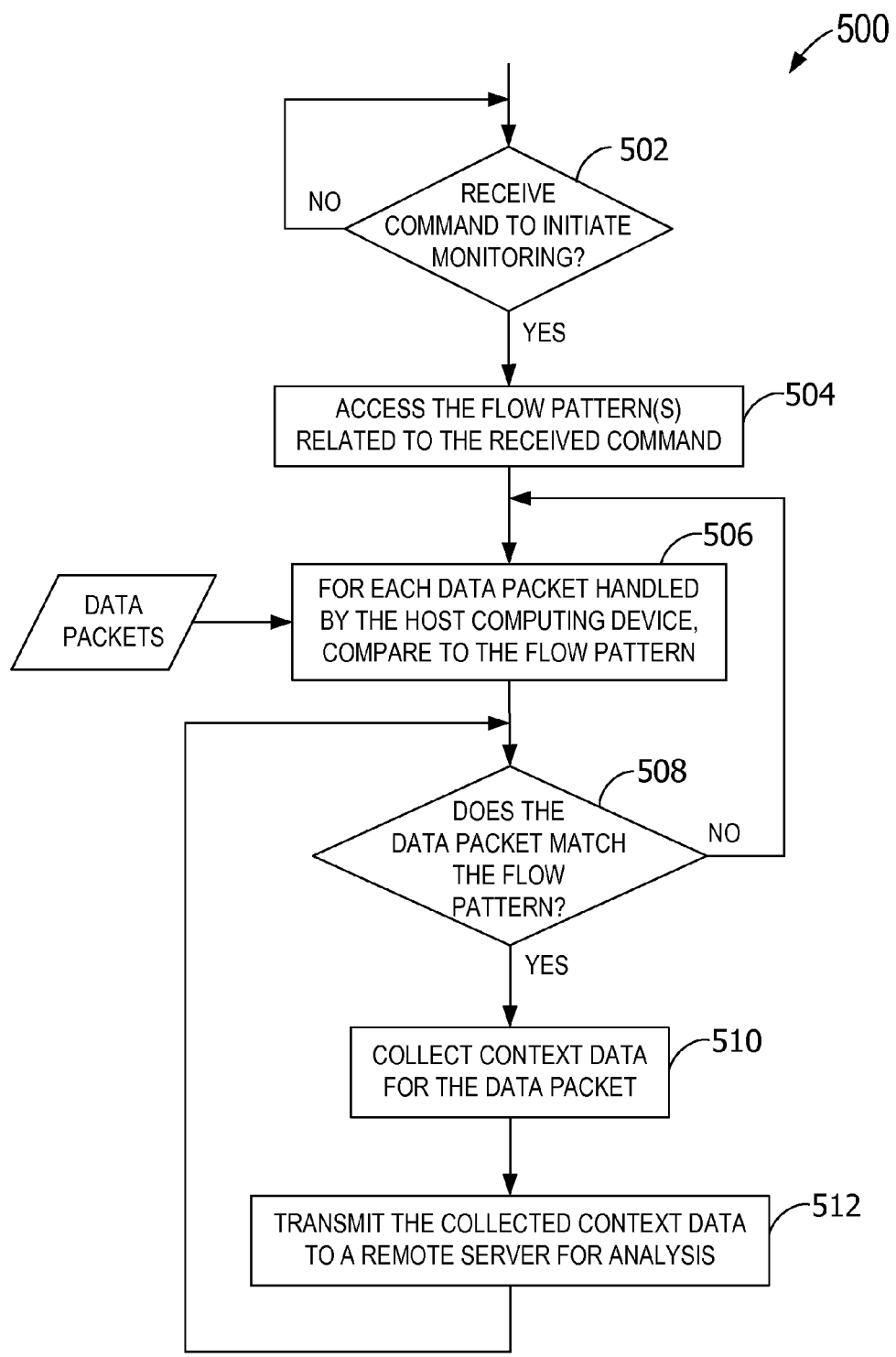
FIG. 5 is a flowchart of an exemplary method performed by a host computing device, or other entity managing virtual machines, to monitor data packets and collect context data for selected data packets.

FIG. 5 is a flowchart of an exemplary method 500 performed by host computing device 100, or other entity managing virtual machines (e.g., an edge appliance such as a virtual gateway at the edge of a virtual network to monitor data packets and collect context data for selected data packets. For example, one or more of the operations illustrated in FIG. 5 may be performed by one or more of host components 308 illustrated in FIG. 3. However, while method 500 is described with reference to execution by host computing device 100 (shown in FIG. 2), it is contemplated that method 500 may be performed by any computing device, application, and/or other entity. For example, method 500 may be performed by a virtual gateway, hypervisor 210, VMs 235, applications 270, and/or guest operating system 265.

At 502, host computing device 100 checks whether a command or request to initiate flow monitoring has been received. For example, the command is received from management component 306 or other entity within virtual datacenter 302. Upon receipt of the command to initiate flow monitoring, host computing device 100 receives, obtains, or otherwise accesses flow pattern 130 associated with the command at 504. Host computing device 100 stores flow pattern 130 in memory area 104. For example, host computing device 100 caches flow pattern 130 into a hash table at the kernel level.

At 506, for each data packet handled by host computing device 100 (e.g., routed) within one more virtual networks, host computing device 100 compares the data packet to flow pattern 130. For example, host computing device 100 compares the source and destination addresses of each data packet to the source and destination addresses specified in flow pattern 130. At 508, for each of the data packets, host computing device 100 determines whether the data packet matches flow pattern 130, or otherwise satisfies criteria associate with flow pattern 130.

If host computing device 100 determines that the data packet matches flow pattern 130, host computing device 100 increases a pattern reference counter (e.g., at the kernel level) and collects context data describing the matching data packet at 510 (e.g., at the user level). For example, host computing device 100 collects the context data by identifying at least one of a forwarding port, any filters applied to the data packet, results of any applied filters, a virtual network encapsulating the data packet, and whether the received data packet has been copied, cloned, and/or dropped.

In some embodiments, host computing device 100 collects the context data for only those data packets matching flow pattern 130, out of a plurality of data packets handled by host computing device 100. As such, host computing device 100 does not collect the context data for each and every data packet received, but collects data for only those data packets matching flow pattern 130. In this manner, the cost of flow monitoring, in terms of latency and/or resource consumption (e.g., processing, memory, etc.), is reduced relative to merely sending a report on every single routed data packet whether or not the data packets are of interest to user 108.

At 512, host computing device 100 transmits the collected context data, for each matching data packet, to a reporting device, server, or other entity. In some embodiments, each of host computing devices 100 within virtual datacenter 302 has access to the reporting device to enable the aggregate of the context data on the reporting device.

If the data packet does not match flow pattern 130 at 508, context data is not collected and transmitted to the reporting device. Rather, processing continues with the next handled data packet at 506.

In embodiments, the operations illustrated in FIG. 5 may be performed by a virtual gateway application, operating as a virtual gateway from a first virtual network to a second virtual network. In such embodiments, the virtual gateway application derives flow table information from flow pattern 130. As such, the virtual gateway application compares each routed data packet to flow pattern 130 by comparing each routed data packet to the derived flow table information.

Figure 6:
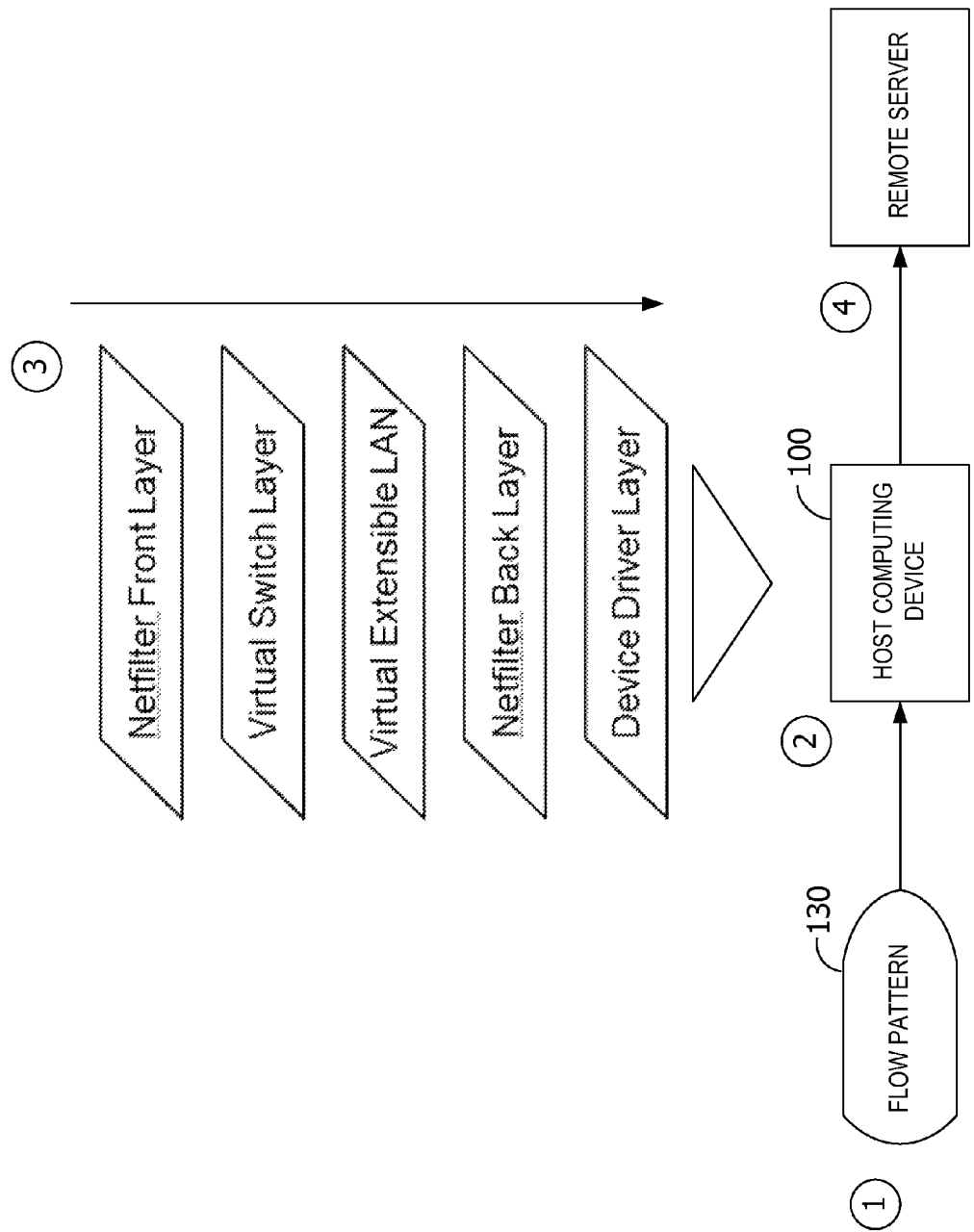
FIG. 6 is a block diagram illustrating exemplary flow monitoring in a stack in a host computing device.

FIG. 6 is a block diagram illustrating exemplary flow monitoring or tracing in a stack in host computing device 100. In the example of FIG. 6, the stack includes a netfilter front layer (e.g., an IOChain/DVFilter layer for distributed virtual filtering), a virtual switch layer (e.g., a PortGroup layer), a virtual extensible local area network (LAN) layer, a netfilter back layer (e.g., another IOChain/DVFilter layer for distributed virtual filtering), and a device driver layer (e.g., a NicDriver layer). The virtual extensible LAN, such as the VXLAN brand software from VMware, Inc., represents an encapsulation mechanism that runs between virtual switches to enable VMs 235 to be deployed on, and move between, any servers within virtual datacenter 302.

Exemplary operations associated with flow monitoring are next described. While the operations are described as being performed by host computing device 100 in some embodiments, the operations may be performed by any module, device, application, etc. that acts as a bi-directional packet filter between a virtual switch and a device driver to filter network traffic entering the virtual switch from VMs 235 or exiting the virtual switch to VMs 235. In some embodiments, the bi-directional packet filter is embodied in a software Ethernet switch providing network connectivity within a virtual network environment.

User 108 defines flow pattern 130 at Operation 1 and flow tracing is enabled at Operation 2. The packet footprint is traced according to flow pattern 130 at Operation 3, and the network flow is analyzed via the data packets. For each matching data packet, host computing device 100 collects the context data described in Table 1 below.

TABLE 1

Exemplary Context Data.

| Packet Metadata | Layer 3 5-tuple Metadata |
|---|---|
| portIDs | List of portIDs that the packet accessed |
| Distributed virtual filters | List of filters that the packet passed (e.g. invoked) |
| IOChains | List of function addresses that the packet passed (e.g., called) |
| <func, result> | Function calls and the results therefrom |
| <clone/copy> | Clone or copy records of the packet |

Each of the elements of the context data shown in Table 1 may include additional data, such as a timestamp.

At Operation 4, the collected context data is sent to a remote server. For example, the footprint record for the data packet is sent to the remote server when the data packet is about to be freed. Alternatively or in addition, the collected context data is batched for a plurality of matching data packets and flushed to the remote server periodically and/or intermittently. For example, host computing device 100 may send 32 footprints records at a time. Upon collecting enough footprint records (e.g., satisfying a pre-defined threshold), the remote server determines the flow record.

In an exemplary implementation, host computing device 100 reserves extra memory space in each data packet when creating, copying and/or cloning the packet. The extra memory space is used to capture context data, and may be referred to as the footprint record. When the data packet is copied or cloned, the footprint record is also copied. In some embodiments, host computing device 100 allocates 64 kilobytes for the footprint record, which includes 8 bytes for the functional address, 4 bytes for the result, 4 bytes for the portID, 16 bytes for the timestamp, and 32 bytes for other metadata.

Figure 7:
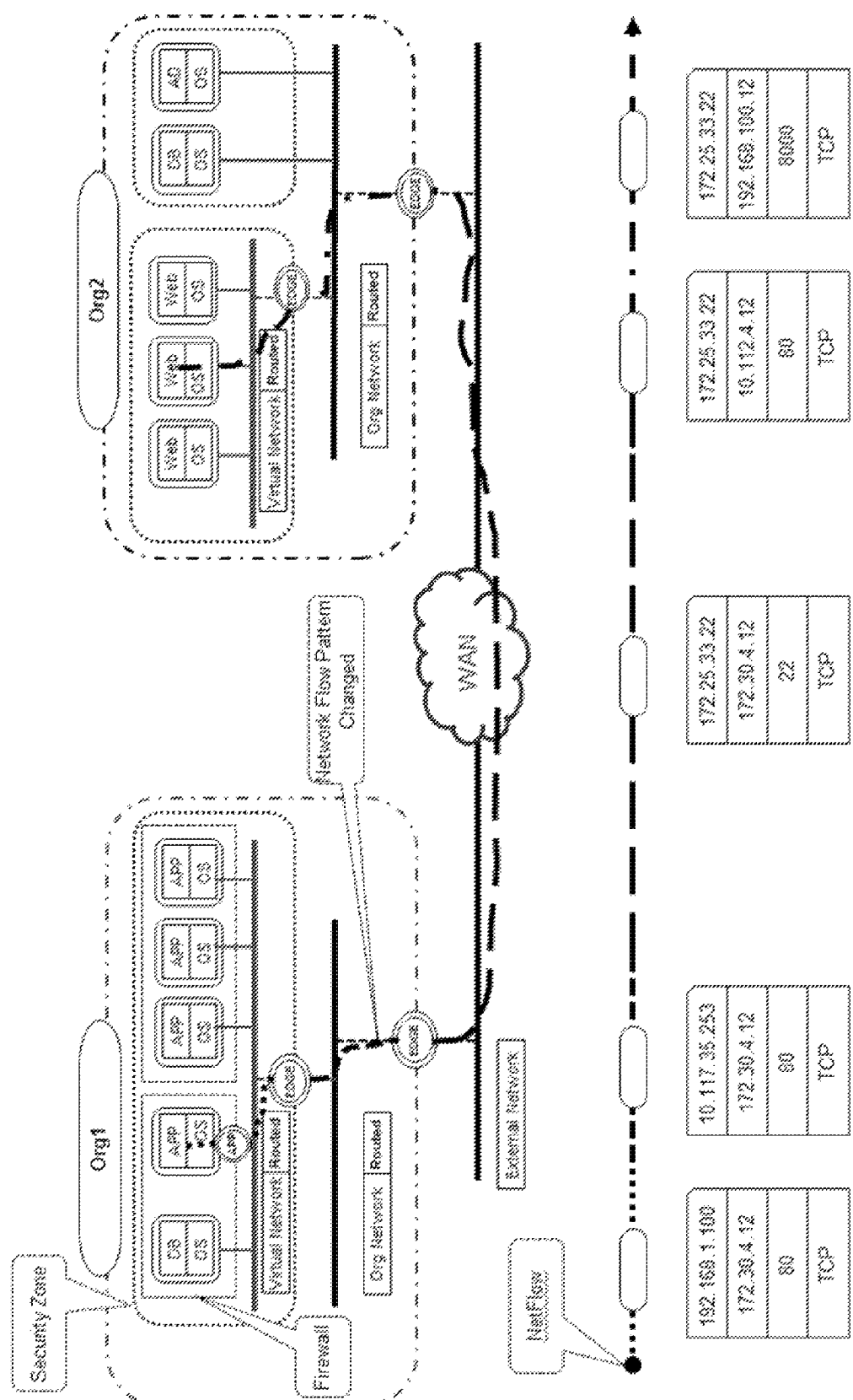
FIG. 7 is a block diagram illustrating exemplary end-to-end flow monitoring between two organizations.

FIG. 7 is a block diagram illustrating exemplary end-to-end flow monitoring between two organizations. In this example, a user in one organization (Org1) is accessing web services provided by another organization (Org2). The exemplary network path between Org1 and Org2 is illustrated in FIG. 7 and shown to pass through several zones or edges:

Source→vAppNetwork1→OrgNetwork→External-Network→OrgNetwork2→vAppNetwork2→Destination In the example of FIG. 7, "edge" represents an edge gateway and "app" represents an application firewall. The virtual gateways between Org1 and Org2 may be implemented using the vShield Edge and/or the vShield App, both from VMware, Inc. Aspects of the disclosure access virtual gateway network profiles for the virtual gateways to understand the virtual network flow patterns. For example, the virtual gateway network profiles may be obtained from a cloud operating system and/or cloud application executed by virtual datacenter 302. In the example of FIG. 7, five virtual network flow patterns are illustrated. Flow pattern 130 is given by the application in Org1 with <SRC: 192.168.1.100, DST: 172.30.4.12, DST Port: 80, Protocol: TCP>. Host computing device 100 communicates with the other virtual network appliances shown in FIG. 7 to understand the routing policies on the virtual gateways and then deduce the remaining virtual network flow patterns. The remaining virtual network flow patterns represent the flow patterns (e.g., source address, destination address, port number) along the entire network path. In the example of FIG. 7, the virtual network flow patterns change several times as the traffic passes through several routers in the network path (e.g., from 192.168.1.100 to 172.25.33.22).

Figure 8:
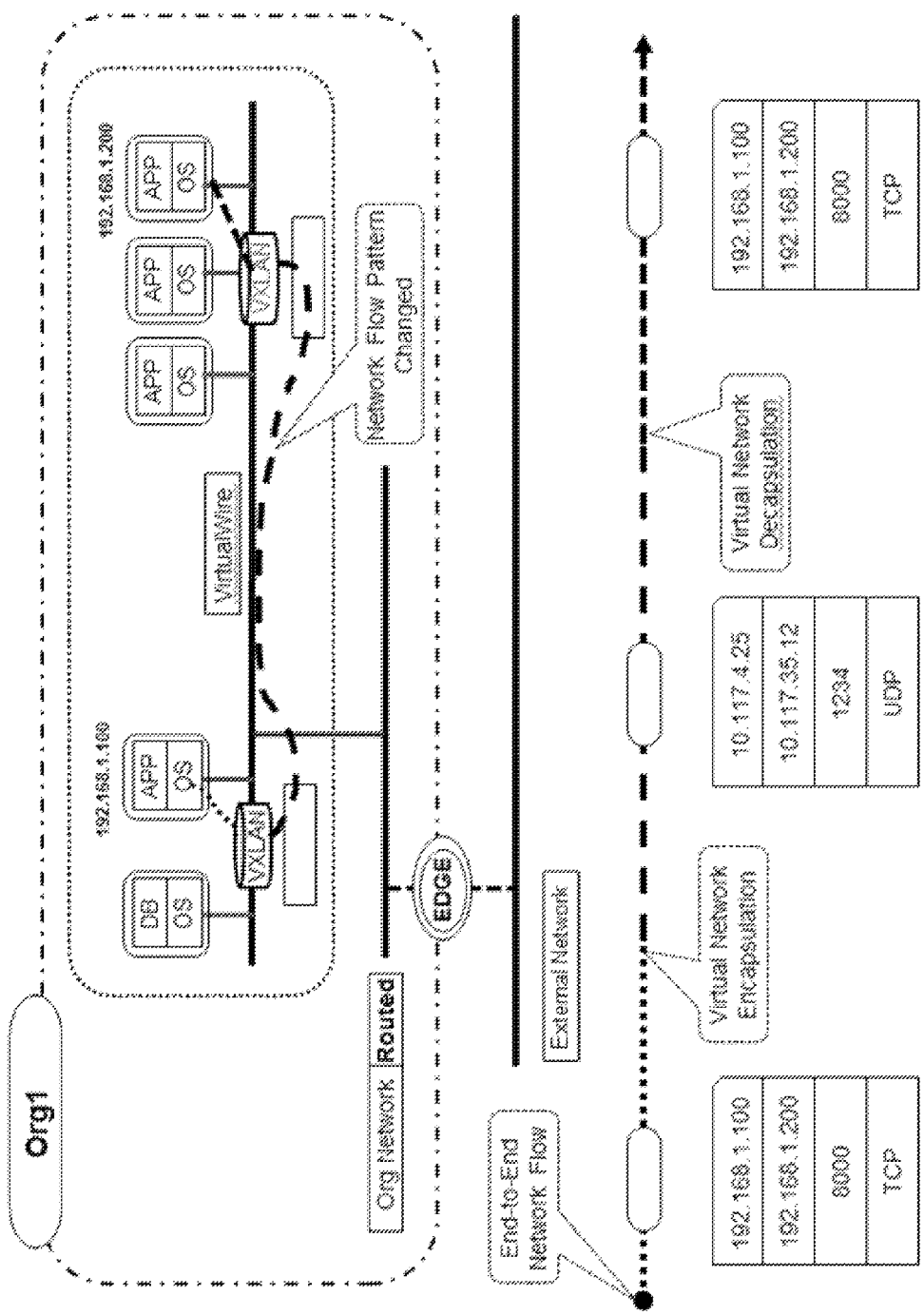
FIG. 8 is a block diagram illustrating exemplary end-to-end flow monitoring with network encapsulation.

FIG. 8 is a block diagram illustrating exemplary end-to-end flow monitoring with network encapsulation. In the example of FIG. 8, network traffic with flow pattern 130 represented by <SRC: 192.168.1.100, DST: 192.168.1.200, DST Port: 8000, Protocol: TCP> is encapsulated and decapsulated within the same virtual network. The virtual extensible LAN application performing the encapsulation and the virtual extensible LAN application performing the decapsulation execute the operations illustrated in FIG. 5 to enable identification and tracing of data packets matching flow pattern 130. Aspects of the disclosure are operable with any encapsulation/decapsulation operations, such as those associated with the VXLAN brand software from VMware, Inc.

Figure 9:
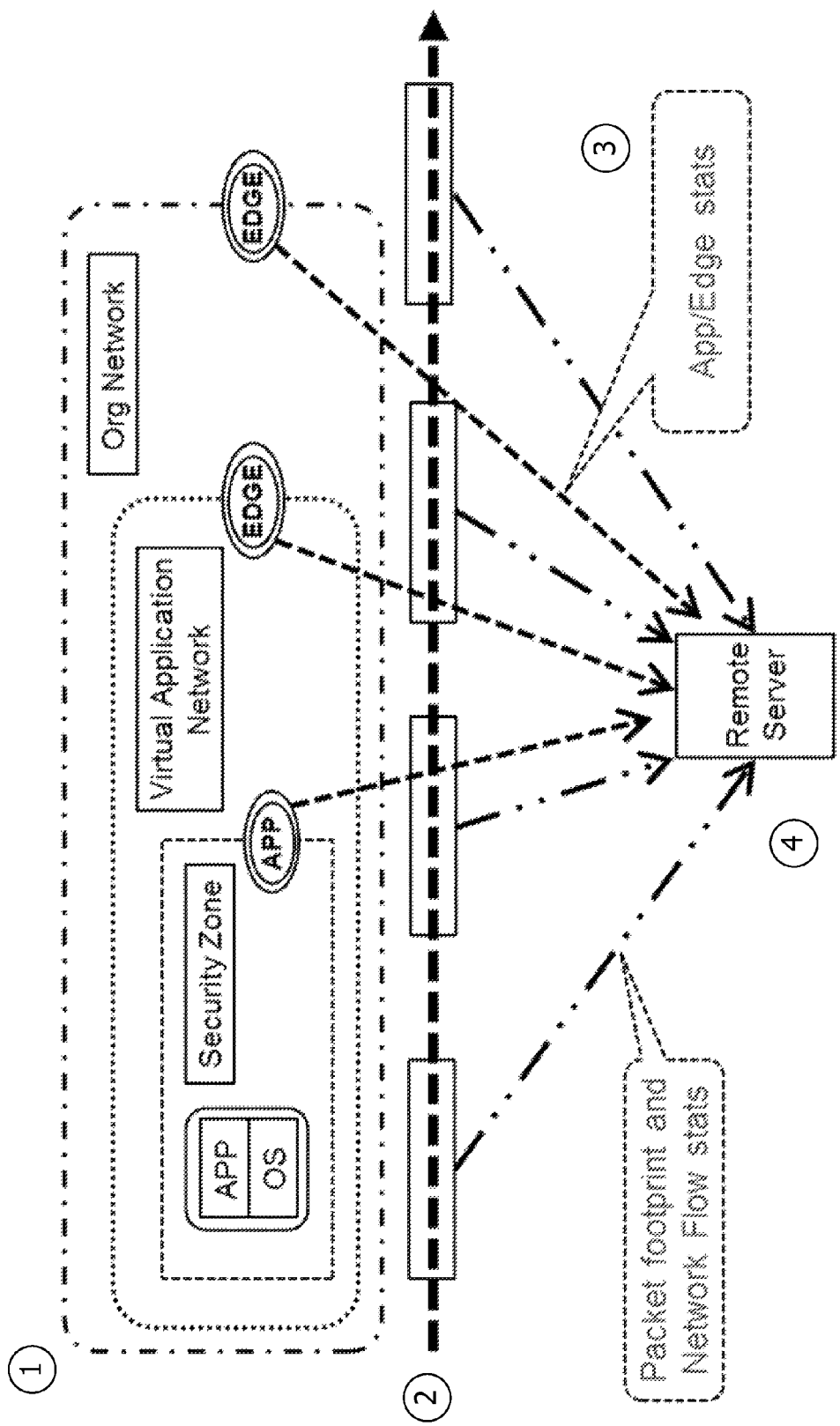
FIG. 9 is a block diagram illustrating exemplary flow monitoring at virtual gateways.

FIG. 9 is a block diagram illustrating exemplary flow monitoring at virtual gateways. An application implementing the operations illustrated in FIG. 4 (e.g., executing on host computing device 100) enables flow monitoring by communicating with virtual datacenter 302 (e.g., a cloud operating system) to obtain a description of the infrastructure within virtual datacenter 302 at Operation 1. For example, the application establishes an authenticated channel with the cloud operating system managing virtual datacenter 302 to obtain a network profile describing the virtual network infrastructure. The network profile represents the virtual network topology and configuration information that identifies, among other data, host computing devices 100 sitting in the network flow path.

At Operation 2, the application identifies the hosts involved in a target network flow path, and distributes flow pattern 130 to each of the hosts to initiate flow monitoring. At Operation 3, flow pattern 130 is distributed to virtual gateways and other virtual network edge appliances to initiate flow monitoring. At Operation 4, the virtual network appliances (e.g., hosts, virtual gateways, etc.) send the context data for data packets matching flow pattern 130 to a remote server for analysis and reporting.

Figure 10A:
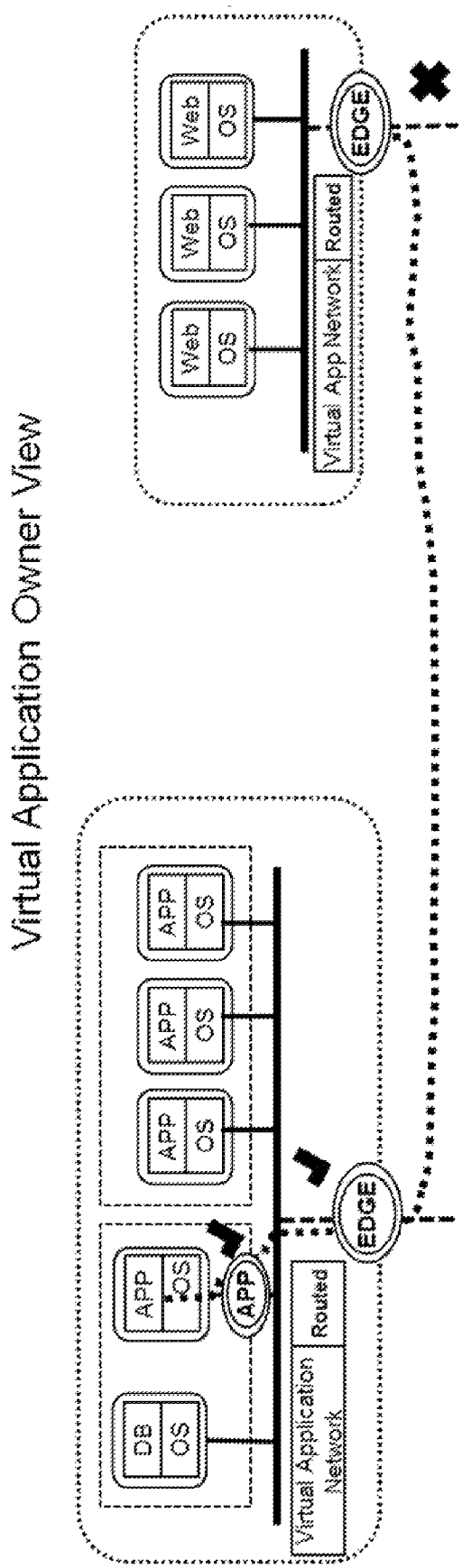
FIGS. 10A, 10B, and 10C are block diagrams illustrating exemplary filtering of flow information based on user role.
Figure 10B:
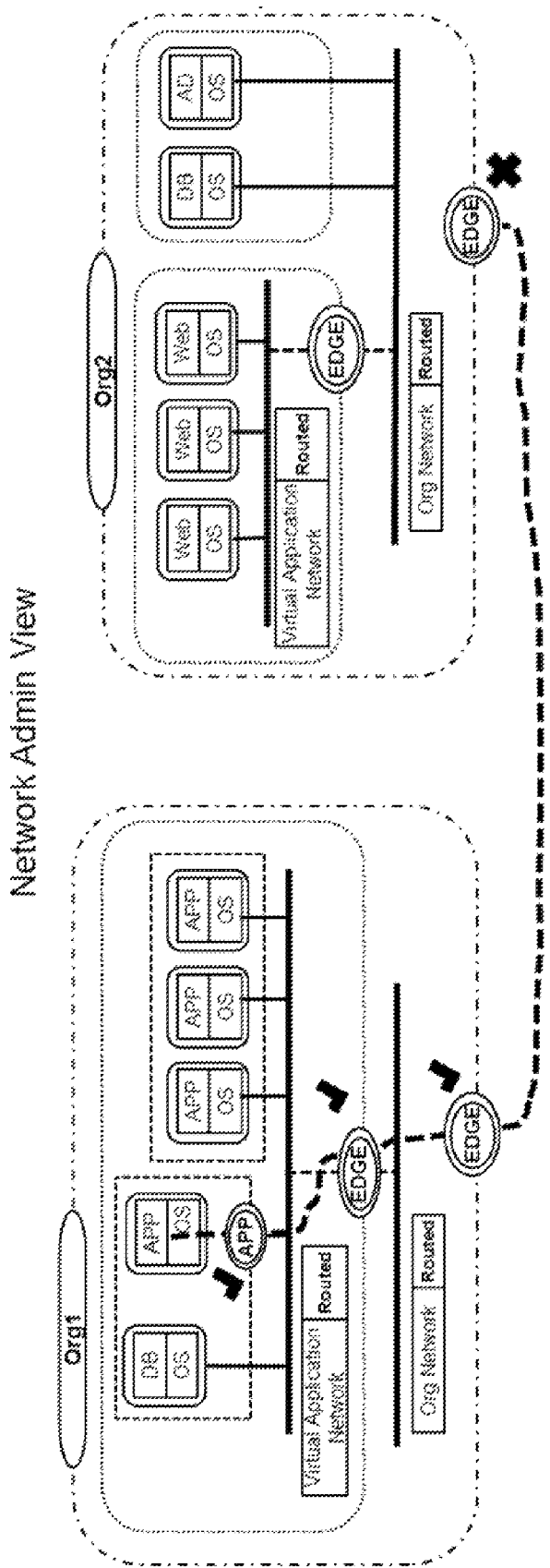
Figure 10C:
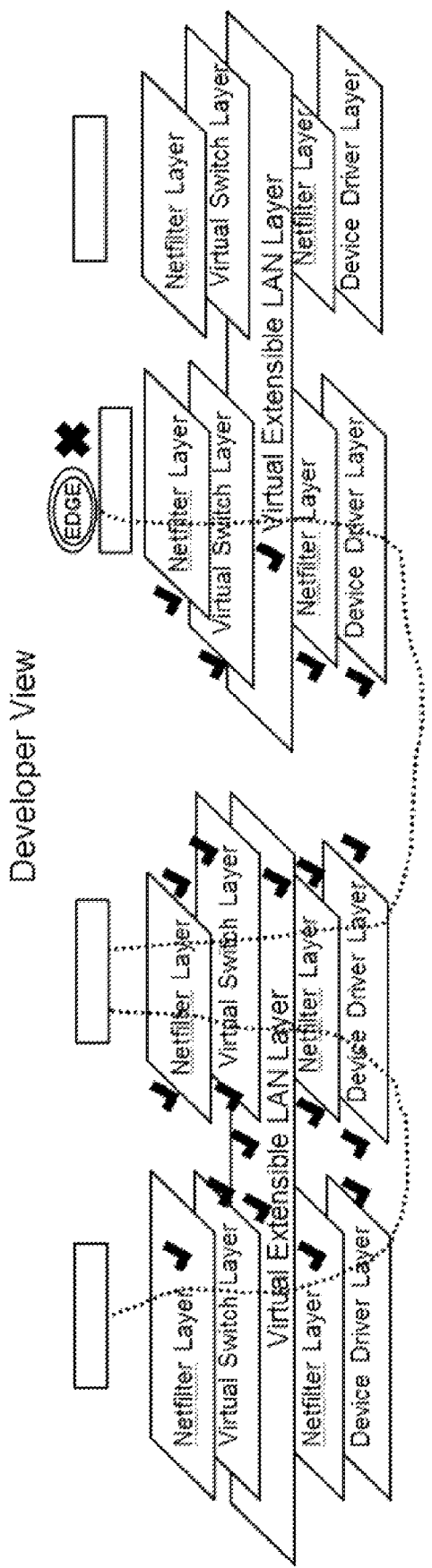

FIGS. 10A, 10B, and 10C are block diagrams illustrating exemplary filtering of flow information based on user role. The flow information represents the aggregated context data for data packets matching flow pattern 130. In this example, the flow information indicates a network issue and is filtered based on three different user roles: a virtual application owner (e.g., a customer), a network administrator, and a developer. FIG. 10A illustrates the virtual application owner view, FIG. 10B illustrates the network administrator view, and FIG. 10C illustrates the developer view. The checkmarks in the figures indicate successful passing of the data packets, whereas the "X" in the figures indicates where the network issue is occurring.

The virtual application owner view represents a top level view (e.g., high-level logical view) presenting the network flow from a source virtual network to a destination virtual network. The virtual application owner view indicates to the virtual application owner that the network issue is occurring at the edge of the destination virtual network. The network administrator view represents a middle level view (e.g., infrastructure or stack view) presenting the network flow across the overall virtual network infrastructure. The network administrator view indicates to the network administrator that the network issue is occurring at the edge of the destination organization network. The developer view represents a low level view (e.g., component level) presenting the functional level packet footprints and network flow across the hosts. The developer view indicates to the developer that the network issue is occurring because of a destination edge gateway configuration.

The different views illustrated in FIGS. 10A, 10B, and 10C may be presented to users 108 by an application executing on the remote server, on a device within virtual datacenter 302, by the cloud operating system managing virtual datacenter 302, and/or by another entity.

In this manner, aspects of the disclosure present differentiated troubleshooting views according to user role. For example, the functional packet tracing path is presented to technical support and developers, while the logical network path is presented to network administrators to enable efficient identification of network issues in a top-down fashion.

Additional Examples

The following scenarios are merely exemplary and not intended to be limiting in any way.

In one scenario, the remote server aggregating the context data for data packets matching flow pattern 130 allows third party vendors to develop filtering criteria to create customized views of the aggregated context data. For example, rather than presenting the three different views in FIGS. 10A, 10B, and 10C, other views may be created.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for end-to-end tracing of the one or more data packets through virtual datacenter 302 based on a footprint for each of the one or more data packets.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for end-to-end virtual network flow monitoring in a virtual datacenter having a plurality of virtual machines (VMs), said system comprising:
   a memory area associated with the virtual datacenter, said memory area storing a flow pattern including at least a source address and a destination address, the flow pattern being received from a user in a request to perform virtual network flow monitoring; and
   a processor programmed to:
      distribute the flow pattern stored in the memory area to a plurality of applications in the virtual datacenter, each of the plurality of applications managing a plurality of VMs as part of at least one virtual network;
      aggregate, by the virtual datacenter from the plurality of applications, context data for one or more data packets routed by the plurality of applications and matching the flow pattern;
      determine a role associated with the user;
      generate, by the virtual datacenter based on the determined role, at least one of a plurality of virtual network monitoring views using the aggregated context data; and
      present the generated at least one of a plurality of virtual network monitoring views to the user.

2. The system of claim 1, wherein the plurality of applications operate as at least one of a host computing device or a virtual gateway.

3. The system of claim 1, wherein the processor is further programmed to display the aggregated context data to the user.

4. The system of claim 1, wherein the flow pattern further comprises at least one of a transmission control protocol (TCP) or a user datagram protocol (UDP).

5. The system of claim 1, wherein the user comprises at least one of a virtual application owner, an administrator, or a developer.

6. The system of claim 1, wherein the processor aggregates the context data across a logical network boundary.

7. The system of claim 1, wherein the processor is further programmed to execute end-to-end tracing of the one or more data packets through the virtual datacenter based on a footprint for the one or more data packets.

8. A method comprising:
   for a plurality of computing devices associated with one or more virtual networks in a virtual datacenter, the virtual datacenter comprising a plurality of virtual machines (VMs): accessing, by the computing device, a flow pattern providing a source address and a destination address;
   receiving a data packet from the one or more virtual networks;
   comparing, by the computing device, the received data packet to the accessed flow pattern defined by a user;
   based on the comparison, collecting data describing the received data packet;
   aggregating context data for one or more data packets routed from the one or more virtual networks and matching the flow pattern;
   determining a role associated with the user;
   generating, by the virtual datacenter based on the determined role, at least one of a plurality of virtual network monitoring views using the aggregated context data; and
   presenting the generated at least one of a plurality of virtual network monitoring views to the user.

9. The method of claim 8, wherein collecting the data comprises identifying at least one of a forwarding port, a filter applied to the data packet, a virtual network encapsulating the data packet, whether the received data packet has been copied, or whether the received data packet has been cloned.

10. The method of claim 8, wherein collecting the data comprises collecting the data on determining that the received data packet matches the accessed flow pattern.

11. The method of claim 8, wherein the computing device receives a plurality of the data packets, and wherein collecting the data comprises collecting the data for only those data packets, from the plurality of data packets, that match the accessed flow pattern.

12. The method of claim 8, wherein receiving the data packet comprises receiving, by a host computing device, a data packet.

13. The method of claim 8, wherein the computing device comprises a virtual gateway application, and further comprising deriving, by the virtual gateway application, flow table information from the accessed flow pattern.

14. The method of claim 13, wherein comparing the received data packet to the accessed flow pattern comprises comparing the received data packet to the derived flow table information.

15. The method of claim 8, wherein the computing device comprises a host, and wherein collecting the data comprises collecting the data across a network stack within the host.

16. One or more non-transitory computer-readable storage media storing computer-executable components for performing end-to-end virtual network flow monitoring in a virtual datacenter having a plurality of virtual machine (VMs), the computer-executable components comprising:
   a plurality of host components that each, when executed, cause at least one processor to:
      receive a data packet;
      compare the received data packet to a flow pattern defined by a user, the flow pattern including at least a source address and a destination address; and
      based on the comparison, collect context data describing the received data packet; and
   a management component in communication with each of the plurality of host components, the management component, when executed, causing at least one processor to:
      aggregate the collected context data from one or more of the plurality of host components;
      determine a role associated with the user;
      generate, by the virtual datacenter based on the determined role, at least one of a plurality of virtual network monitoring views using the aggregated collected context data; and
      present the generated at least one of a plurality of virtual network monitoring views to the user.

17. The non-transitory computer storage media of claim 16, wherein the management component further receives, from the user, a request to perform the virtual network flow monitoring, the request including the flow pattern.

18. The non-transitory computer storage media of claim 16, wherein the management component further distributes the flow pattern to each of the plurality of host components.

19. The non-transitory computer storage media of claim 16, wherein each of the plurality of host components manages a plurality of VMs.

20. The non-transitory computer storage media of claim 16, wherein at least one of the plurality of host components represents a virtual gateway from a first virtual network to a second virtual network.

* * * * *